(12) United States Patent
Iben

(10) Patent No.: US 6,994,141 B2
(45) Date of Patent: Feb. 7, 2006

(54) PROCESS, APPARATUS, AND SYSTEM FOR ADHESIVE BOND STRENGTH RECOVERY USING JOULE HEATING

(75) Inventor: Icko E. T. Iben, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 48 days.

(21) Appl. No.: 10/338,319

(22) Filed: Jan. 8, 2003

(65) Prior Publication Data

US 2004/0129362 A1 Jul. 8, 2004

(51) Int. Cl.
*B32B 31/26* (2006.01)
*G11G 5/40* (2006.01)

(52) U.S. Cl. .................. 156/359; 156/378; 156/379; 360/313

(58) Field of Classification Search ................ 156/359, 156/378, 379; 360/313, 325, 324, 318, 322, 360/326, 327, 314, 315
See application file for complete search history.

(56) References Cited

U.S. PATENT DOCUMENTS

| | | | |
|---|---|---|---|
| 4,635,415 A * | 1/1987 | Schumacher et al. ...... 52/127.1 |
| 5,440,233 A * | 8/1995 | Hodgson et al. ............ 324/252 |
| 5,680,282 A | 10/1997 | Alhert et al. ............... 360/113 |
| 5,828,532 A | 10/1998 | Ahlert et al. ............... 360/113 |
| 5,892,637 A * | 4/1999 | Brooks, Jr. et al. ...... 360/234.5 |
| 5,914,834 A * | 6/1999 | Gustafson ................ 360/234.5 |
| 5,939,624 A * | 8/1999 | Smith, Jr. .................... 73/105 |
| 2001/0012169 A1 | 8/2001 | Kobayashi et al. ........ 360/72.3 |
| 2001/0012170 A1 | 8/2001 | Yotsuya et al. ............... 360/75 |

* cited by examiner

Primary Examiner—George Koch
(74) Attorney, Agent, or Firm—Kunzler & Associates

(57) ABSTRACT

A process, apparatus, and system are presented for adhesive bond strength recovery in a bonded system, which may be an electronic device, such as, a magnetic drive or magnetic disk drive. The adhesive bond strength of an adhesive bonding material degrades over time and under certain ambient conditions, such as humidity. The process, apparatus, and system are designed to recover at least a portion of the initial adhesive bond strength through the application of joule heating. The adhesive bonding material, and possibly the materials bonded by the adhesive bonding material, is heated via an embedded heat source within the bonded system. The embedded heat source receives electric power from a controlled power source that selectively applies power to achieve optimum heating and adhesive bond strength recovery consistent with a characterization of the bonded system, heat source, and adhesive bonding material.

13 Claims, 5 Drawing Sheets

PROCESS, APPARATUS, AND SYSTEM FOR ADHESIVE BOND STRENGTH RECOVERY USING JOULE HEATING

BACKGROUND OF THE INVENTION

1. Field of the Invention

The invention relates to adhesive bonds and more particularly to recovery of adhesive bond strength within an electronic system.

2. Description of Related Art

For most bonded materials, the adhesive bond strength between a material and an adhesive degrades when exposed to ambient conditions, especially humidity. Extended exposure of the bonded material to humidity can cause degradation of the strength of an adhesive bond between the adhesive and a bondable material. Ultimately, this degradation may result in complete failure of the bond and potential inoperability or destruction of the bonded system.

When an adhesive bond has degraded due to humidity or other ambient conditions, one process of bond strength recovery allows for at least partial, if not complete, recovery of the initial bond strength. This process involves exposing the adhesive bonding material to elevated temperatures of sufficient level to physically and/or chemically affect and enhance the bond between the adhesive and the originally bonded material.

Current methods of submitting the adhesive bond to elevated temperatures, in electronic devices particularly, presents substantial obstacles of both financial and practical scope. Specifically, electronic devices typically are not suited for placement in a high temperature oven. Additionally, the adhesively bonded device may not be readily accessible or extractable from the device. Similarly, the electronic device may be embedded in a larger system and inaccessible for heating purposes or it may be unadvisable to heat the entire system due to other constraints such as heat sensitive materials or parts within the larger system. The labor and system downtime costs associated with the removal and reinstallation of a device or component are likely to be expensive and prohibitive, even if the electronic device were designed for the required elevated temperatures. Furthermore, placing the entire system in a heating source such as an oven could require substantial cost for a large device and heating the entire system might damage other heat sensitive components.

The availability of a suitable heating method poses a substantial downfall to the potential recovery of any current adhesively bonded systems. It is unlikely that a suitable heat source in which an electronic device might be placed for recovery of adhesive bond strength would be found within reasonable proximity of the majority of electronic devices on the market and in use in personal, commercial, institutional, and other functions. The availability of a suitable heat source is further limited when such heat source would require the functionality to monitor the necessary parameters of the bonded system in order to efficiently control the adhesive bond strength recovery.

The prior art specifically addresses very limited, distantly related aspects of this problem of recovering bond strength. For example, a process for detecting the presence of condensation within a device has been presented, but addresses neither the effects of condensation on an adhesively bonded system nor the need or method for recovery of the adhesive bonding strength.

Another process disclosed in the prior art indirectly relates to the problem presented. A method that employs a temperature sensor in the vicinity of a magnetic head is presented to avoid adhesion between a magnetic media and the magnetic head. While the concept of sensing temperature within a device is discussed, it is employed to avoid adhesion between two materials that should not adhere to one another, rather than to recover bond strength of the adhesion between two materials that are purposefully adhered one to the other.

What is needed are an apparatus and process for elevating and controlling temperatures of an adhesive bonding material within an electronic device so as to recover the adhesive bond strength between the adhesive and the bonded material. Such an apparatus and process would benefit from an ability for automatic operation and self-monitoring. The apparatus and process would further benefit from an implementation internal and integral with the adhesive bonding system and device.

BRIEF SUMMARY OF THE INVENTION

The present invention has been developed in response to the present state of the art, and in particular, in response to the problems and needs in the art that have not yet been fully solved by any currently available adhesive bond strength recovery apparatus, process, or system. Accordingly, the present invention has been developed to provide a system, apparatus, and process for recovering adhesive bond strength in a bonded system within an electronic device that overcome many or all of the above-discussed shortcomings in the art.

The apparatus for adhesive bond strength recovery is provided with a logic unit containing a plurality of modules configured to carry out various functions of adhesive bond strength recovery. These modules in the described embodiments include a power source control module, a monitor module, a characterization module, and a definition module.

In one embodiment, the adhesive bond strength recovery apparatus is configured to apply heat to an adhesively bonded subsystem within an electric device. The power source control module controls a power source that supplies electric power to a heat source embedded in the bonded system. The embedded heat source may be a heating element implanted in the bonded system solely for the purpose of transferring heat to the adhesive bonding material.

The power source control module controls the amount of heat applied according to a set of optimum bond strength recovery parameters set forth by the definition module. The optimum bond strength recovery parameters may depend on a set of properties characterizing the bonded system and made available via the characterization module. During the heating cycle, the monitor module assesses the actual bond strength recovery parameters as compared to the optimum and monitored bond strength recovery parameters and may ultimately determine when the heating cycles terminates under adverse conditions.

In a further embodiment, the adhesive bond strength recovery apparatus may include a bonded system in the form of a magnetic read/write head. A magnetic head may be a bonded system as well as an embedded heat source. In particular, a magnetic read/write head may include a lithographically etched substrate adhesively bonded to a base substrate. Within the lithographically etched substrate may be formed embedded read and write heads. Application of power to the write head will cause the write head, lithographically etched substrate, base substrate, and adhesive bonding material to be heated above ambient temperatures. The temperature rise is proportional, in a manner commonly known in the art, to the total power supplied to the write and read heads. The proportionality coefficient can be calibrated at the factory and loaded into the adhesive bond strength recovery apparatus, for example.

Alternatively or additionally, the write or read head may be used as a temperature sensor. For example, since the resistance of read head is temperature dependent, a resistance-versus-temperature table for the device characteristics may be loaded into the device memory, for example, and accessed by the monitor module to determine the device temperature according to the measured device resistance.

As has been mentioned, either the read or write heads may serve as a heat source or a temperature sensor. Similarly, a single device may be employed for both operations of heating and sensing. In a magnetic read/write head, preferably the write head is employed as the heat source and the read head is employed as the temperature sensor. Such an embodiment is based on the present suitability of a write head to better withstand elevated temperatures and a read head is typically connected to circuitry configured to measure device resistance. An alternative embodiment may well reverse these roles of the read and write heads and still adequately recover the adhesive bond strength of the adhesive bonding material. Additionally, other devices of similar configuration may be substituted for one or both of the read and write heads heretofore discussed.

In yet a further embodiment, the adhesive bond strength recovery apparatus may include a bonded system in the form of a magnetic disk head suitable for reading from and/or writing to a magnetic disk storage media. Such a magnetic disk head may be substantially similar to the magnetic head described above.

A process of the present invention is also presented for recovering the adhesive bond strength of a bonded system. The process in disclosed embodiments involves the steps necessary to carry out the functions presented above with respect to the operation of the apparatus.

Specifically, the process characterizes a set of properties of the bonded system. These properties may include such characterizations as age of the bonding system, time period since the most recent bond strength recovery attempt, the type of adhesive bonding material present, and potentially a number of other factors that may impact the performance of the apparatus.

The process in one embodiment also defines a set of optimum adhesive bond recovery parameters, which may depend at least in part on the characterized properties of the bonded system. Some of the possible optimum parameters that may be defined may depend on the type of bonded system to be processed. The optimum adhesive bond recovery properties may include an optimum power level, optimum heating temperature, and optimum time duration or series of heating cycles.

The process continues with the application of heating cycles, power levels, and such as may have been defined by the definition module. While applying heat, for example through a power source electrically transferring heat to the bonded system via an embedded heat source, the process monitors and assesses a series of actual bond recovery parameters, such as resistance and calculated temperature of the bonded system. If, while monitoring, the process determines that excessive temperature or time duration has surpassed a particular threshold, the process may end. Otherwise the process may iteratively monitor the actual parameters of the adhesively bonded system.

A system of the present invention is also presented for recovering the adhesive bond strength of a bonded system. The system presented includes an electronic device having integrally installed an apparatus for recovering the adhesive bond strength of a bonded subsystem within the electronic device. The functionality of the electronic device is unaffected by the presence and employment of a recovery apparatus, except for the enhancement of adhesive bond strength and resulting performance of the device.

These and other objectives, features, and advantages of the present invention will become more fully apparent from the following description and appended claims, or may be learned by the practice of the invention as set forth hereinafter.

BRIEF DESCRIPTION OF THE DRAWINGS

In order that the manner in which the advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1:
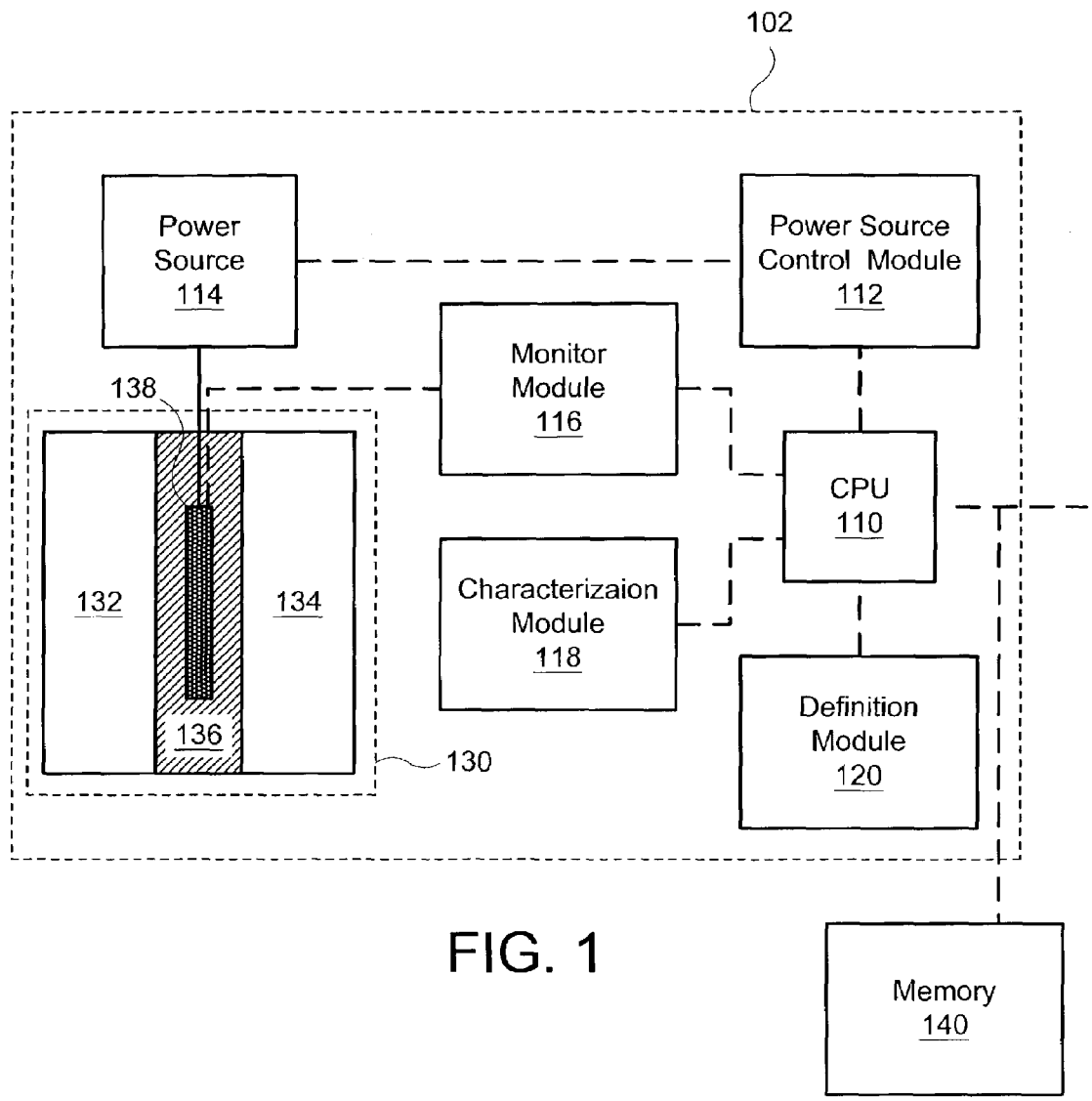
FIG. 1 is a schematic block diagram illustrating one embodiment of a representative adhesive bond strength recovery apparatus in accordance with the present invention.

FIG. 1 depicts one embodiment of a representative adhesive bond strength recovery apparatus 102. The apparatus 102 includes a central processing unit (CPU) 110, a power source control module 112, a power source 114, a monitor module 116, a characterization module 118, a definition module 120, and a bonded system 130.

The CPU in the illustrated embodiment is configured to transmit and receive electronic control signals (via dashed lines) to and among the various other components 112, 116, 118, 120 and may be additionally capable of communication with electronic memory 140 depicted in one embodiment independent of the apparatus 102. In an alternate embodiment, the memory 140 may be local to the apparatus 102. Such electronic memory 140 may contain a set of control instructions defining apparatus 102 operations. Additionally, the electronic memory 140 may be used to store sample data obtained by the apparatus 102 for characterization and monitoring, as will be discussed further in conjunction with these figures.

The power source control module 112 in one embodiment receives control instructions via the CPU 110 and serves as an interface between the CPU 112 and the power source 114. The power source 114 is configured to transmit a controlled amount of electric current (shown as a solid line) to the bonded system 130 for heating one or more components of the bonded system 130. In one embodiment, the power source control module 112 and the power source 114 may be combined in the functionality of a single device for the same purpose.

The monitor module 116 is electronically interconnected with the CPU 110 and one or more components of the bonded system 130 and is configured to assess a set of actual bond recovery parameters of the bonded system 130 while the power source 114 is supplying electrical current as described above.

The characterization module 118 is also linked in electronic communication to the CPU 110. The characterization module 118 is configured to characterize a set of properties associated with one or more components of the bonded system 130 such that the characterization may be utilized by the system 102 at least in part to determine how much power is to be delivered by the power source 114 to the bonded system 130. The characterization module 118 may be linked in electronic communication to the electronic storage memory 140 via the CPU 110 or some other electronic means, as depicted, for the purpose of storing at least the characterization data. In another embodiment, the characterization module 118 may be linked in electronic communication directly with electronic storage memory 140.

The definition module 120 is in one embodiment electrically interconnected with the CPU 110 and is capable of defining a set of one or more optimum bond recovery parameters, such as temperature, time duration, current and power level, iterations, or any other similar parameter. In one embodiment the definition module 120 may utilize the characterization data of the characterization module 118 for input in a mathematical calculation. Alternately, the definition module 120 may receive electronic input via the CPU 110 from a data source (not shown) not integral to the apparatus 102, such as a human user or an electronic administrator program.

The bonded system 130 in the depicted embodiment includes a first bondable material 132 and a second bondable material 134 adhesively bonded by an adhesive bonding material 136. The first and second bondable materials 132, 134 may be materials of like matter, i.e. they may both be plastic, glass, ceramic, metal, etc., or the bondable materials 132,134 may be of dissimilar materials. Furthermore, the bondable materials 132,134 may be of similar or distinct physical sizes, electronic functions, or other defining characteristic. Regardless of the material of the first bondable material 132 and the second bondable material 134, the adhesive bonding material 136 as shown is capable of providing an adhesive bond between the two bondable materials 132, 134.

In the embodiment represented, the bonded system 130 also includes an embedded heat source 138 shown separate from but within the adhesive bonding material 136. The embedded heat source 138 may also be embedded in the surface of one of the first and second bondable materials 132, 134 at or near the interface with the adhesive bonding material 136. The embedded heat source 138 is electrically connected to the power source 114 and electronically connected to the monitor module 116. The power source 114 is configured to provide electric power to the embedded heat source 138 while the monitor module 116 may assess a set of actual bond recovery parameters as explained previously.

The embedded heat source 138 as shown dissipates electric power received from the power source 114 to the components of the bonded system 130 in the form of heat. As the system 130 is heated via the embedded heat source 138 in a controlled manner via the power source control module 112, the adhesive bonding material 136 preferably recovers at least a portion of its original adhesive bond strength as applied to the first and second bondable materials 132, 134.

In another embodiment not shown, the first bondable material 132, or the second bondable material 134, or a combination of the first and second bondable materials 132, 134 may also serve as or contain the embedded heat source 138, as will be described in conjunction with the following figure. In yet a further embodiment, the adhesive bonding material 136 having electrically conductive properties may serve as the embedded heat source 138.

Figure 2:
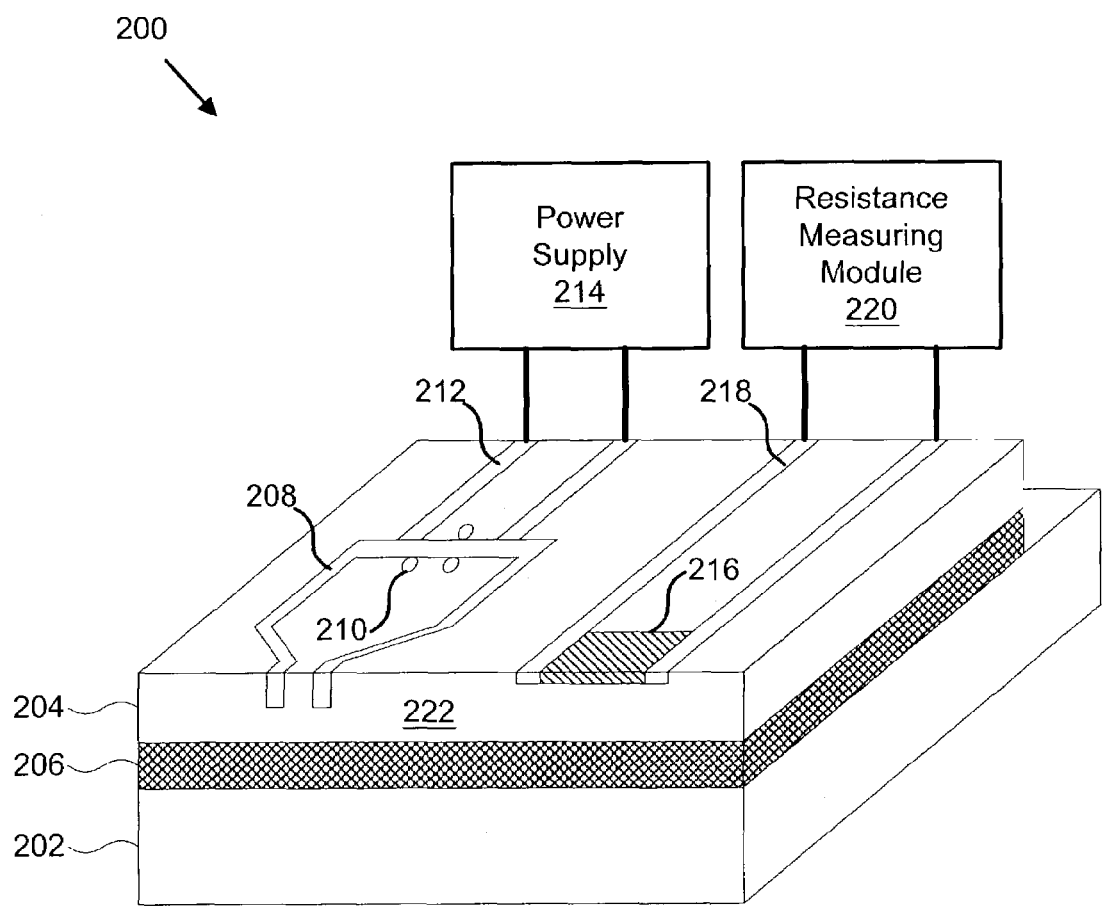
FIG. 2 is a schematic block diagram illustrating one embodiment of a representative magnetic head in accordance with the present invention.

FIG. 2 depicts a representative read/write head 200 that is given by way of example of a bonded system 130 of FIG. 1. In the illustrated embodiment, the head 200 includes a base substrate 202, a lithographically etched substrate 204, and an adhesive bonding material 206 that operably bonds the base substrate 202 and the etched substrate 204. The air bearing surface 222 of the head 200 is configured to allow contact with a magnetic media (not shown). Embedded within the etched substrate are a write head and a read head.

The write head may include a magnetic core 208 around which may be coiled a conductive winding 210 for the purpose of inducing a magnetic field around the magnetic core 208. The conductive winding 210 may be connected to one or more conductive writer leads 212 that are electrically linked to a power supply 214. The write head is configured to store magnetic field patterns on the magnetic media as the power supply 214 transfers power through the conductive writer leads 212 to the conductive winding 210. The power transferred through the conductive winding 210 creates a magnetic field pattern around the magnetic core 208, which magnetic field pattern is transferred to the magnetic media. In an alternative embodiment the power supply 214 may be further configured to measure the resistance of the conductive winding 210 and conductive writer leads 212.

The read head may include a resistive reader element 216 that is electrically linked via one or more conductive reader leads 218 to a resistance measuring module 218. The resistive reader element is typically configured to generate electrical current that is dependent on the magnetic field patterns on the magnetic media traveling across the air bearing surface 222. The generated electrical current is measured by the resistance measuring module 220 via the conductive reader leads 218.

Generally, in modern read/write heads, the read head and write head are small devices deposited onto the substrate 204, which is adhesively bonded to the base substrate 202 by an adhesive bonding material.

Comparing the head 200 assembly to the bonded system 130, the base substrate 202 corresponds to the first bondable material 132. Similarly, the lithographically etched substrate 204 in FIG. 2 corresponds to the second bondable material 134. Additionally, the adhesive bonding material 206 and the adhesive bonding material 136 correlate one to the other. The conductive winding 210 and conductive writer leads 212 correspond to the embedded heat source 138. In FIG. 1, the embedded heat source 138 also served as a temperature sensing device. In FIG. 2, however, the resistive reader element 216 used for temperature sensing is separate from the conductive winding 210 and conductive writer leads 212 that serve as the embedded heat source 138. The power supply 214 corresponds to the power source 114 and the resistance measuring module 220 corresponds to the monitor module 116.

What may be less apparent in the instant comparison is the correlation between the conductive windings 210 and conductive writer leads 212 and the embedded heat source 138. In fact, in the given embodiment the conductive windings 210 and conductive writer leads 212 of the write head is well-suited for heating the adhesive bonding material 206, as well as the base substrate 202 and the etched substrate 204, for substantial durations of time with regard to recovering the bond strength of the adhesive bonding material. Such heating of the substrates 202, 204 and the adhesive bonding material 206 may be facilitated in one embodiment by allowing current levels in the conductive windings 210 and conductive writer leads 206 212 to exceed typical storage device drive operating levels, thereby transferring heat to substrates 202, 204 and the adhesive bonding material 222.

One potential effect of contact between the head 200 and magnetic media is heat transfer and dissipation from the read/write head 200 to the magnetic media, possibly lowering desired bond recovery effects or possibly damaging the magnetic media. In one embodiment, applying power levels to generate sufficient heat transfer requires that the head be free and clear of any direct contact with a magnetic media that might be damaged by such heat. One skilled in the art will recognize that the relative location of the media and head 200 under heating conditions will depend on the characteristics of the magnetic media material, the characteristics of the head 200, and the amount of heat applied to the conductive windings 210 and the conductive writer leads 212, and the sources of heat sinks, among other things.

Figure 3:
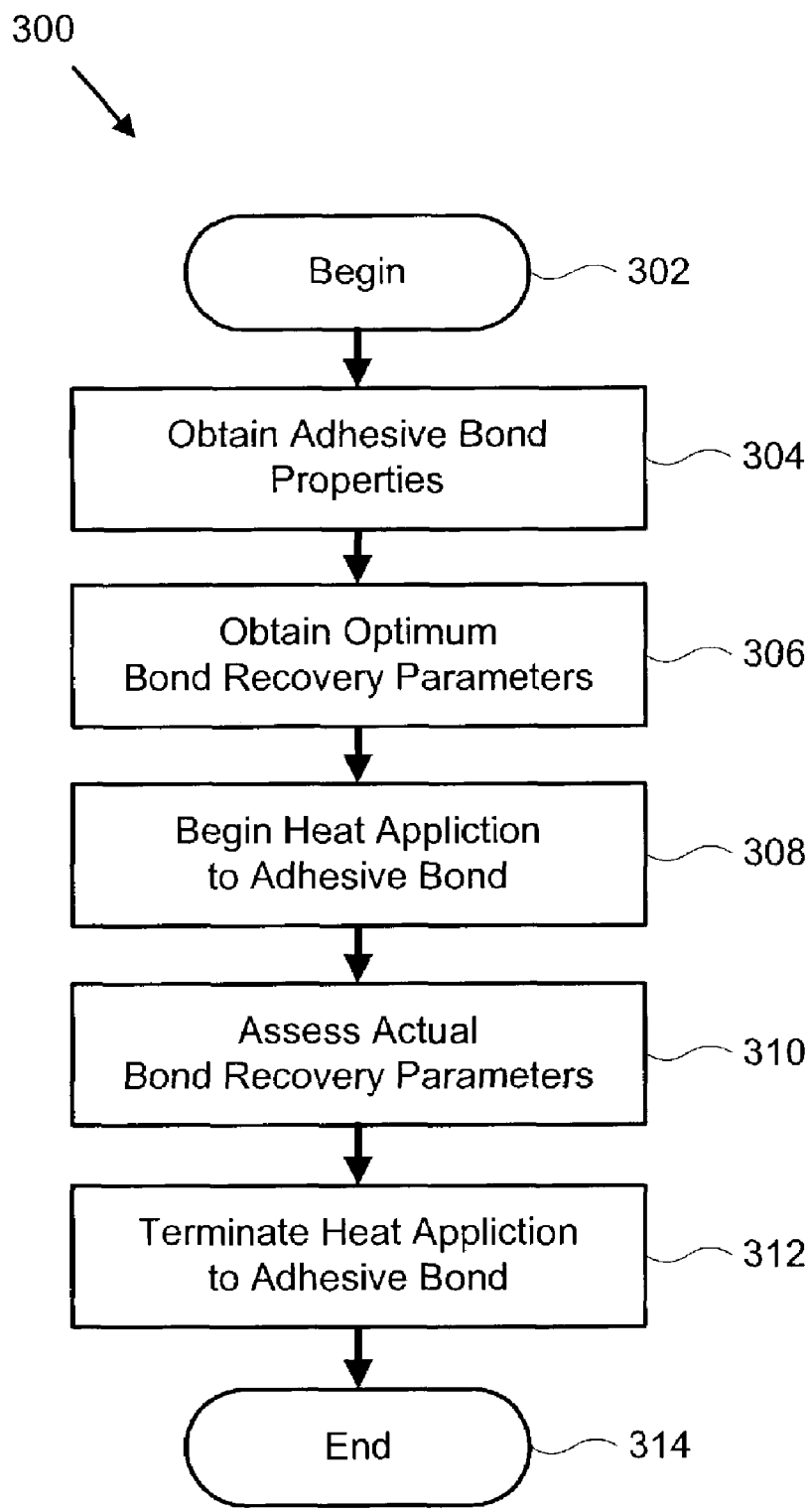
FIG. 3 is a schematic flow chart diagram illustrating one embodiment of a representative process for adhesive bond strength recovery in accordance with the present invention.

FIG. 3 depicts a representative adhesive bond strength recovery process 300 suitable for implementation via the adhesive bond strength recovery apparatus 102 or similar device. The process 300 begins 302 by obtaining 304 a set of properties associated with the bonded system 130, such as heating properties of the adhesive bonding material 136. In one embodiment, this is conducted automatically using the characterization module 118 of FIG. 1. Nevertheless, any manner of obtaining 304 the properties may be used, including calculation and input by an operator. Once the properties of the bonded system 130 have been obtained 304, it may be unnecessary to execute this step 304 for subsequent heating cycles. However, if some of the properties of the bonded system 102, such as the age of the system since manufacture or previous heating cycle, are determined to vary over time, it may be necessary to characterize 304 the properties of the bonded system 304 with each execution of a heating cycle.

The adhesive bond strength recovery process 300 also obtains 306 the optimum bond recovery parameters that will produce an optimum bond strength recovery of the adhesive bonding material 136. In one embodiment this is conducted automatically by each implementation and may be conducted by the definition module 120 of FIG. 1. Of course, the step 306 may also be conducted manually by an operator. The parameters in one embodiment may include the power level to be applied to the embedded heat source 138, the time duration of each heating cycle, the number of heating cycles per process 300, and the optimal recovery temperature of the embedded heat source 138.

After obtaining 306 the optimum bond recovery parameters, the power source 114 begins to apply 308 a determined amount of electric current to the embedded heat source 138 consistent with the defined parameters of step 306. During the heating cycle, the monitor module 116 or a similar device assesses 310 the actual bond recovery parameters of the embedded heat source 138. These parameters may include the time duration and the calculated temperature of the embedded heat source 138. The process 300 then terminates 312 the application of heat to the embedded heat source 138 and subsequently ends 312.

Figure 4:
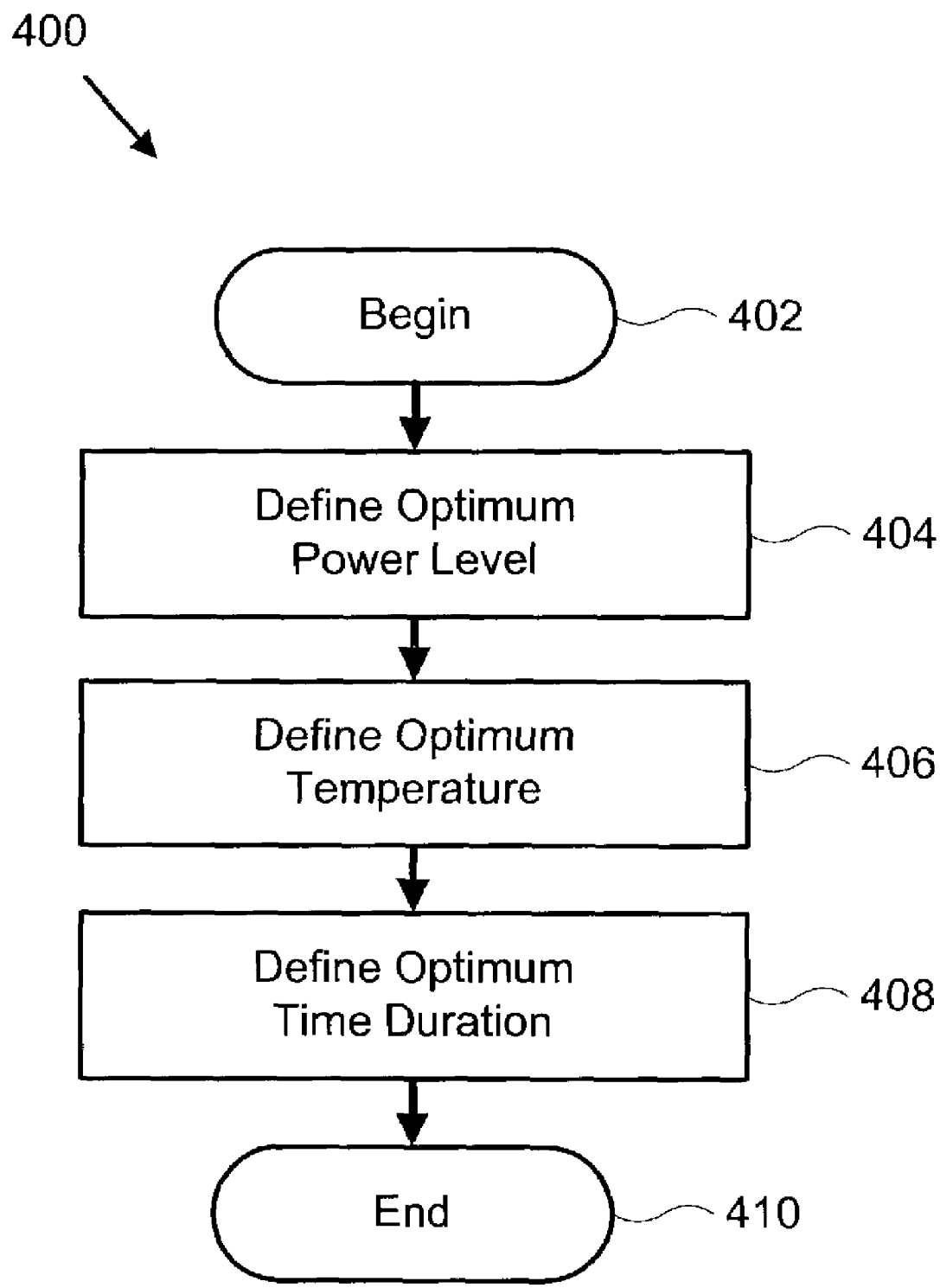
FIG. 4 is a schematic flow chart diagram illustrating one embodiment of a representative process for optimum bond recovery parameter definition given by way of example of an optimum bond recovery parameter definition step of FIG. 3.

FIG. 4 depicts a representative parameter definition process 400 for optimum bond recovery given by way of example of an optimum bond recovery parameter definition step 306 of FIG. 3. The parameter definition process 400 illustrated begins 402 and defines 404 an optimum power level to be applied to the embedded heat source 138, defines 406 an optimum temperature of the embedded heat source 138, and defines 408 an optimum time duration of the heating cycle.

The optimum bond recovery parameters may in one embodiment include the definition 404 of a constant power level over a single heating cycle of defined 408 time duration. In another embodiment, the parameters may be dynamically defined 404, 406 over a variably defined 408 time duration. In yet another embodiment, the definition 408 of the time duration may include a plurality of shortened heating cycles distributed over an extended time duration. As will be readily understood and implemented by one skilled in the art, the optimum bond recovery parameters defined in steps 404, 406, 408 in the parameter definition process 400 may include a variety of independent, co-dependent, constant, and variable parameters as might best recover the bond strength of a particular bonded system 130 and adhesive bonding material 136.

Figure 5:
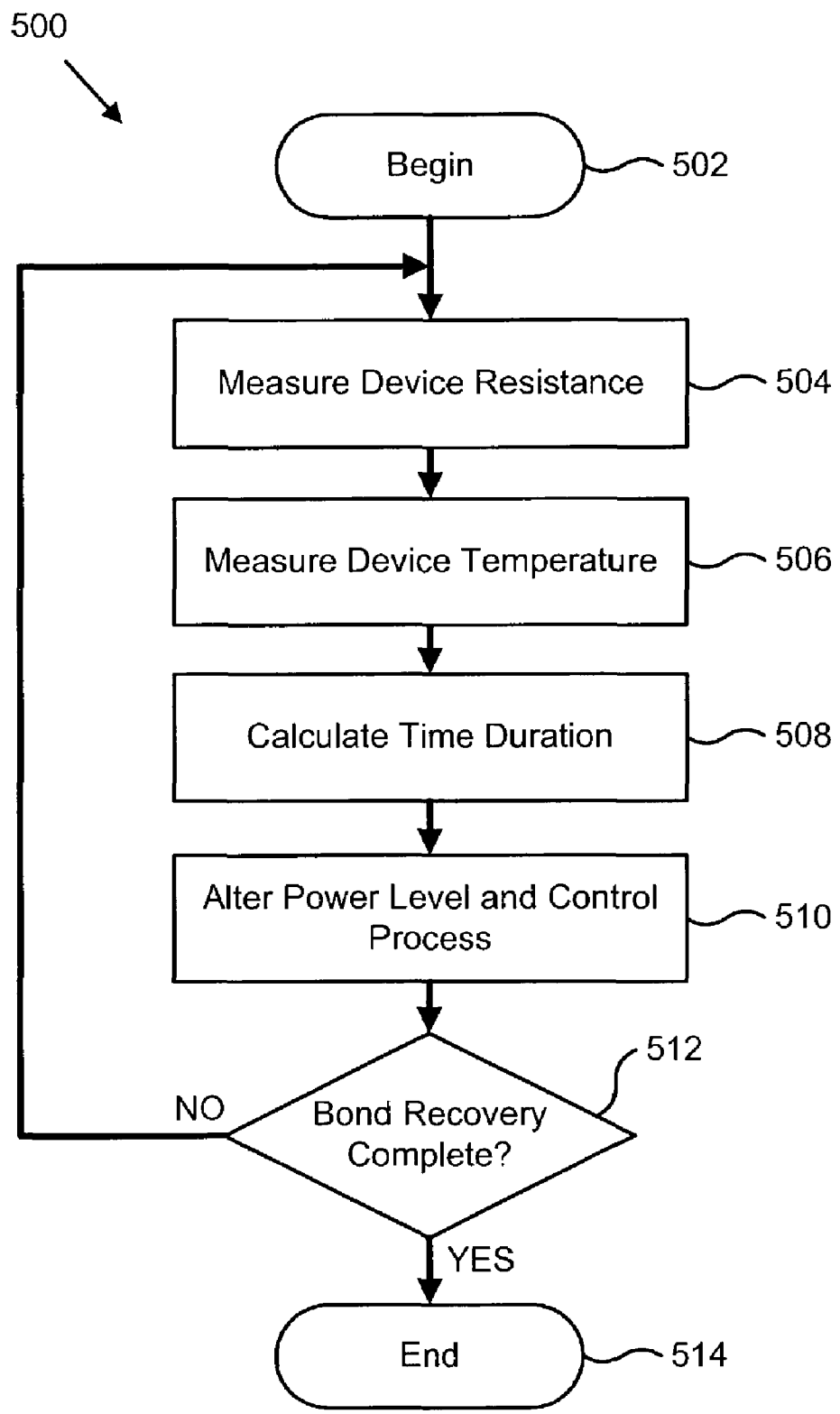
FIG. 5 is a schematic flow chart diagram illustrating one embodiment of a representative process for adhesive bond strength recovery and monitoring given by way of example of an actual bond recovery parameter assessment step of FIG. 3.

FIG. 5 depicts a representative adhesive bond strength recovery and monitoring process 500, given by way of example of an actual bond recovery parameter assessment step 310 of FIG. 3. The process 500 is suitable for implementation via a monitor module 116 in conjunction with other components of the adhesive bond strength recovery apparatus 102. The process 500 may be implemented during a heating cycle or series of heating cycles and begins 502 followed by measuring 504 the resistance of the embedded heat source 138 under heating conditions. Using the measured 504 resistance, the process 506 measures the temperature of the embedded heat source 138 in one embodiment, and the temperature of the bonded system 130 in another embodiment. Alternately, the process 500 may calculate the temperature of the embedded heat source 138 or bonded system 130 in a further embodiment.

After the resistance and temperature have been measured 504, 506, the process 500 continues by calculating 508 the time duration of the heating application. This calculation 508 may include calculating the time duration since the beginning 308 of the heating application, in one embodiment. In another embodiment, the time duration calculation 508 may also include a determination of the time remaining in the heating application based on the progress of the heating application. In response to measured and calculated actual bond recovery parameters, the process 500 may alter 510 the power level as required to optimize the recovery of the adhesive bond strength.

The process 500 determines 512 through the steps 504, 506, 508, 510 above if the bond recovery is complete. If it is determined 512 that the bond recovery is not complete, the process 500 iteratively returns to step 504 in a looping fashion until the bond recovery is complete. The process 500 then ends 514.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for adhesive bond strength recovery in an electronic device, the apparatus comprising:
   a first bondable material;
   a second bondable material;
   an adhesive bonding material positioned and operably configured to bond the first and second bondable materials; and
   an embedded heat source positioned and operably configured to apply heat to the adhesive bonding material, wherein application of the heat to the adhesive bonding material recovers the adhesive bond strength of the adhesive bonding material.

2. The apparatus of claim 1, further comprising a heat source control module configured to control an amount of electrical power applied to the embedded heat source.

3. The apparatus of claim 2, wherein the heat source control module is further configured to terminate the application of heat to the adhesive bonding material and avoid damage to the bondable materials, the bonding material, and related electronic circuitry and materials.

4. The apparatus of claim 1, further comprising a monitor module configured to assess a set of actual bond recovery parameters, including an actual bond recovery temperature, while applying heat to the adhesive bonding material.

5. The apparatus of claim 1, further comprising a characterization module configured to obtain a set of properties associated with the bonded system, including the adhesive bonding material.

6. The apparatus of claim 5, further comprising a definition module configured to obtain a set of optimum bond recovery parameters, according to the set of properties associated with the bonded system.

7. The apparatus of claim 6, wherein the set of optimum bond recovery parameters comprises a bond recovery temperature and a bond recovery time duration.

8. The apparatus of claim 6, wherein the set of optimum bond recovery parameters comprises an expression of a relationship between a bond recovery temperature and a bond recovery time duration.

9. The apparatus of claim 2, wherein the embedded heat source comprises at least one component within the electronic device, the component having a primary function other than heating the adhesive bonding material for adhesive bond strength recovery.

10. The apparatus of claim 1, wherein the embedded heat source comprises at least one component within the electronic device, the component having a primary function of heating the adhesive bonding material for adhesive bond strength recovery.

11. The apparatus of claim 1, wherein the adhesive bonding material comprises an electrically conductive material that functions as the embedded heat source.

12. A system for adhesive bond strength recovery in an electronic device, the apparatus comprising:
   an electronic media storage device;
   a first bondable material;
   a second bondable material;
   an adhesive bonding material positioned and operably configured to bond the first and second bondable materials;
   an embedded heat source positioned and operably configured to apply heat to the adhesive bonding material, wherein application of the heat to the adhesive bonding material recovers the adhesive bond strength of the adhesive bonding material;
   heat source control module configured to control an amount of electrical power applied to the embedded heat source;
   a definition module configured to define a set of optimum bond recovery parameters, according to a set of properties associated with the adhesive bonding material, the optimum bond recovery parameters including a bond recovery temperature and a bond recovery time duration; and
   a monitor module configured to assess a set of actual bond recovery parameters, including an actual bond recovery temperature, while applying heat to the adhesive bonding material.

13. A apparatus for adhesive bond strength recovery in a bonded system consisting of a first bondable material, a second bondable material, and an adhesive bonding material positioned and operably configured to bond the first and second bondable materials, the bondable and bonding materials located within an electronic device, the apparatus comprising:
   means for obtaining a set of properties associated with the bonded system, including the adhesive bonding material;
   means for obtaining a set of optimum bond recovery parameters, including a bond recovery temperature and a bond recovery time duration, according to the set of properties associated with the bonded system;

means for applying heat to the adhesive bonding material, according to the optimum bond recovery parameters, via an embedded heat source;

means for controlling an amount of electrical power applied to the embedded heat source; and means for assessing a set of actual bond recovery parameters, including an actual bond recovery temperature, while applying heat to the adhesive bonding material.

* * * * *